US012576977B2

(12) United States Patent
Meisels et al.

(10) Patent No.: US 12,576,977 B2
(45) Date of Patent: Mar. 17, 2026

(54) AIRCRAFT PROPULSION SYSTEM WITH ENGINE RATINGS AS A FUNCTION OF SYSTEM COMPONENTS

(71) Applicant: Pratt & Whitney Canada Corp., Longueuil (CA)

(72) Inventors: David Meisels, Montreal (CA); Richard Freer, St-Basile-le-Grand (CA)

(73) Assignee: Pratt & Whitney Canada Corp., Longueuil (CA)

( * ) Notice: Subject to any disclaimer, the term of this patent is extended or adjusted under 35 U.S.C. 154(b) by 273 days.

(21) Appl. No.: 18/228,986

(22) Filed: Aug. 1, 2023

(65) Prior Publication Data

US 2025/0042559 A1      Feb. 6, 2025

(51) Int. Cl.
*B64D 35/025*          (2025.01)
*B64D 27/24*           (2024.01)
*B64D 27/02*           (2006.01)

(52) U.S. Cl.
CPC ........... *B64D 27/24* (2013.01); *B64D 35/025* (2024.01); *B64D 27/026* (2024.01)

(58) Field of Classification Search
CPC ...... B64D 27/33; B64D 27/355; B64D 35/08; B64D 27/026; B64D 27/24
See application file for complete search history.

(56) References Cited

U.S. PATENT DOCUMENTS 9,586,690 B2 * 3/2017 Rajashekara ........... F01D 21/00
10,081,350 B2 * 9/2018 Zhou ........................ B60L 58/12

12,370,909 B2 * 7/2025 Winter ................... B60L 50/61
2019/0148951 A1 * 5/2019 Wang ................... B60L 53/305
                                              320/109
2020/0055610 A1 * 2/2020 Terwilliger ........... H02J 7/1446
2022/0029430 A1 1/2022 Wang
2022/0063824 A1 3/2022 Hiett
2022/0348341 A1 * 11/2022 Winter .................. B64D 31/18
2023/0042497 A1 2/2023 Terwilliger

OTHER PUBLICATIONS

EP Search Report for EP Patent Application No. 24192461.2 dated Dec. 23, 2024.

* cited by examiner

*Primary Examiner* — Thai T Dinh

(74) *Attorney, Agent, or Firm* — Getz Balich LLC

(57) ABSTRACT

A method of and system for operating a hybrid-electric propulsion system is provided. The system has a thermal engine and an electrical propulsion subsystem having a plurality of components. The method includes providing a set of original engine ratings for operating the hybrid-electric propulsion system, the original engine ratings are based on one or more first performance/capability parameters of an original electrical propulsion subsystem component; replacing the original component with an alternative component, the alternative component having one or more second performance/capability parameters, wherein the second performance/capability parameters are different from the first performance/capability parameters; producing a set of alternative engine ratings based on the second performance/capability parameters; and operating the hybrid-electric propulsion system using the set of alternative engine ratings.

20 Claims, 5 Drawing Sheets

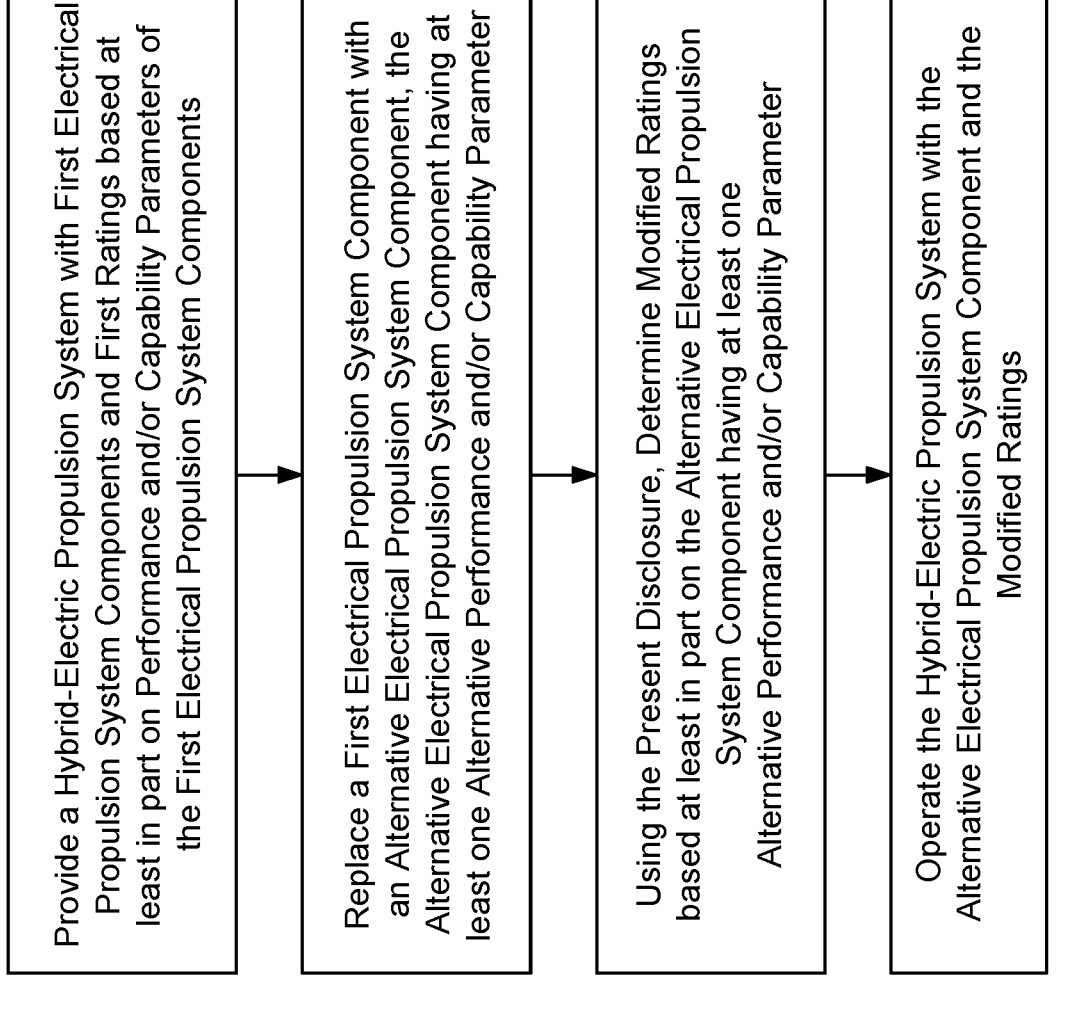

Provide a Hybrid-Electric Propulsion System with First Electrical Propulsion System Components and First Ratings based at least in part on Performance and/or Capability Parameters of the First Electrical Propulsion System Components Replace a First Electrical Propulsion System Component with an Alternative Electrical Propulsion System Component, the Alternative Electrical Propulsion System Component having at least one Alternative Performance and/or Capability Parameter Using the Present Disclosure, Determine Modified Ratings based at least in part on the Alternative Electrical Propulsion System Component having at least one Alternative Performance and/or Capability Parameter Operate the Hybrid-Electric Propulsion System with the Alternative Electrical Propulsion System Component and the Modified Ratings

FIG 3

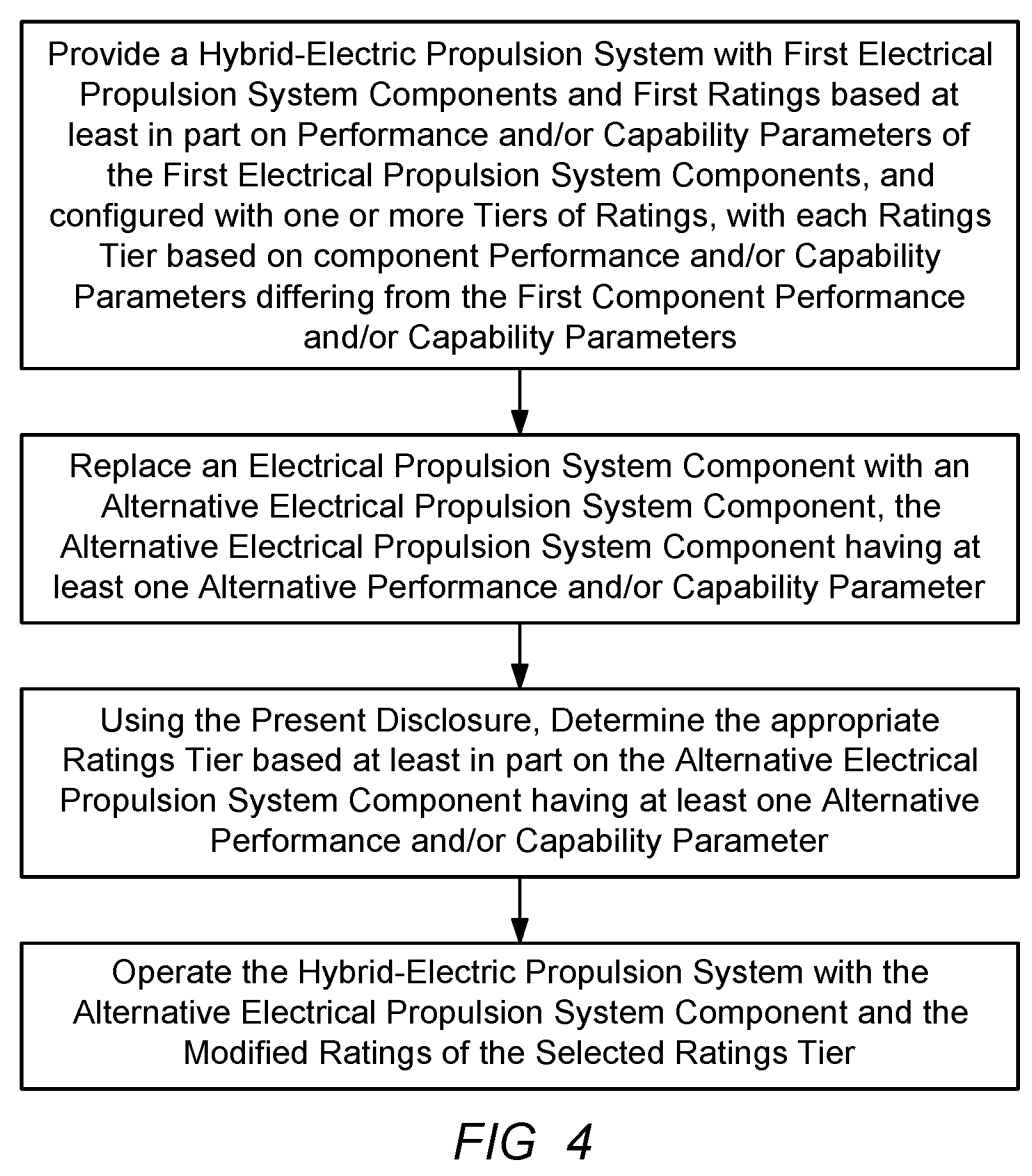

Provide a Hybrid-Electric Propulsion System with First Electrical Propulsion System Components and First Ratings based at least in part on Performance and/or Capability Parameters of the First Electrical Propulsion System Components, and configured with one or more Tiers of Ratings, with each Ratings Tier based on component Performance and/or Capability Parameters differing from the First Component Performance and/or Capability Parameters Replace an Electrical Propulsion System Component with an Alternative Electrical Propulsion System Component, the Alternative Electrical Propulsion System Component having at least one Alternative Performance and/or Capability Parameter Using the Present Disclosure, Determine the appropriate Ratings Tier based at least in part on the Alternative Electrical Propulsion System Component having at least one Alternative Performance and/or Capability Parameter Operate the Hybrid-Electric Propulsion System with the Alternative Electrical Propulsion System Component and the Modified Ratings of the Selected Ratings Tier

*FIG 4*

AIRCRAFT PROPULSION SYSTEM WITH ENGINE RATINGS AS A FUNCTION OF SYSTEM COMPONENTS

BACKGROUND OF THE INVENTION

1. Technical Field

The present disclosure relates aircraft propulsion systems in general and to management of engine ratings of the same in particular.

2. Background Information

The design of an aircraft and many of its components, including its propulsion systems, must be approved by relevant national regulatory agencies; e.g., the U.S. Federal Aviation Administration (FAA), and the like. In terms of the propulsion system, the approval is typically based on engine ratings that are selected by the propulsion system manufacturer. The regulatory approval signifies that the respective aspects of the propulsion system are in compliance with various standards such as air worthiness and the like. Once approval is granted, a "type certification" is granted evidencing the approval of that propulsion system for operation based on the specified engine ratings. The rating of a propulsion system is typically also the minimum performance that is guaranteed by the propulsion system manufacturer for a new system under specific operating conditions, such as takeoff, maximum continuous climb, and cruise power settings. Historically, once a propulsion system is granted its type certificate, that type certificate stays with that propulsion system for the life of the propulsion system provided the design of the propulsion system does not change. Propulsion system/engine ratings that are utilized in the type certification include various engine ratings labeled as "power" ratings for turboshaft and turbopropeller engine applications and labeled as "thrust" ratings for turbojet and turbofan applications. To facilitate the description herein, engine ratings will be discussed in terms of power, but are also applicable to thrust. Some of the aforesaid engine ratings are defined in terms of a continuous duration and others are limited to specific time durations. Examples of engine ratings include maximum takeoff power (MTO), maximum continuous power (MCT), maximum cruise power (MCR), and all engines operating (AEO). Another engine rating that is often required for multi-engine aircraft is an emergency power rating such as a "one engine inoperative" or "OEI" rating. An OEI rating is typically a requirement that a multi-engine aircraft be airworthy for a limited period of time with one engine inoperable; e.g., the OEI regulation requires an aircraft to be able to maintain various positive climb gradients to the end of the takeoff path as well as various positive climb gradients associated with landing configurations and go-around power. These engine ratings and others are chosen by the engine manufacturer and once approval is granted the type certification limits engine operation to these ratings. Importantly, these ratings may dictate engine component lifing based on component time limitations or event occurrences.

What is needed is a system and method that enables approval and type certification for hybrid propulsion systems that may be upgraded over time.

SUMMARY

According to an aspect of the present disclosure, a method of operating a hybrid-electric propulsion system is provided.

The system has a thermal engine and an electrical propulsion subsystem having a plurality of components. The method includes providing a set of original engine ratings for operating the hybrid-electric propulsion system, the original engine ratings based at least in part on one or more first performance and/or capability parameters of an original electrical propulsion subsystem component; replacing the original electrical propulsion subsystem component with an alternative electrical propulsion system component, the alternative electrical propulsion subsystem component having one or more second performance and/or capability parameters, wherein the one or more second performance and/or capability parameters are different from the one or more first performance and/or capability parameters; producing a set of alternative engine ratings based at least in part on the one or more second performance and/or capability parameters; and operating the hybrid-electric propulsion system using the set of alternative engine ratings.

In any of the aspects or embodiments described above and herein, the electrical propulsion subsystem components may include an electrical motor and electrical energy source, and the electrical energy source may be a fuel cell.

In any of the aspects or embodiments described above and herein, the electrical propulsion subsystem components may include an electrical motor and electrical energy storage device, and the electrical energy storage device may be a supercapacitor, or a battery.

In any of the aspects or embodiments described above and herein, the original electrical propulsion subsystem component may be an original battery, and the alternative electrical propulsion subsystem component may be an alternative battery. The original battery may have a first energy storage capacity, and the alternative battery may have a second energy storage capacity, and the second energy storage capacity may be different from the first energy storage capacity. The original battery may have a first C Rating, and the alternative battery may have a second C Rating, and the second C rating may be different from the first C Rating.

In any of the aspects or embodiments described above and herein, the original electrical propulsion subsystem component may be an original electrical motor, and the alternative electrical propulsion subsystem component may be an alternative said electrical motor. The original electrical motor may have a first maximum continuous power rating, and the alternative electrical motor may have a second first maximum continuous power rating, and the second first maximum continuous power rating may be different from the first maximum continuous power rating.

In any of the aspects or embodiments described above and herein, in the original engine ratings the thermal engine may be controlled to provide a first percentage of motive input and the electrical propulsion subsystem may be controlled to provide a second percentage of motive input during a flight segment, and in the alternative engine ratings the thermal engine may be controlled to provide a third percentage of motive input during the flight segment, wherein the third percentage of motive input may be different from the first percentage of motive input, and the electrical propulsion subsystem may be controlled to provide a fourth percentage of motive input during the flight segment, wherein the fourth percentage of motive input may be different from the second percentage of motive input.

In any of the aspects or embodiments described above and herein, the thermal engine may have a first useful life value based on the original engine ratings, and the thermal engine may have a second useful life value based on the alternative engine ratings, and the second useful life value may be different from the first useful life value.

According to an aspect of the present disclosure, a hybrid-electric propulsion system is provided that includes a thermal engine, an electrical propulsion subsystem, and a system controller. The electrical propulsion subsystem has a plurality of components. The system controller is in communication with the thermal engine, the electrical propulsion subsystem, and a non-transitory memory storing instructions. The stored instructions include a set of first engine ratings for operating the hybrid-electric propulsion system that are based at least in part on one or more first performance and/or capability parameters of a first electrical propulsion subsystem component. The instructions when executed cause the system controller to: subsequent to the first electrical propulsion subsystem component being replaced with an alternative electrical propulsion system component, the alternative electrical propulsion subsystem component having one or more second performance and/or capability parameters, wherein the one or more second performance and/or capability parameters are different from the one or more first performance and/or capability parameters, produce a set of alternative engine ratings based at least in part on the one or more second performance and/or capability parameters; and control the hybrid-electric propulsion system using the set of alternative engine ratings.

In any of the aspects or embodiments described above and herein, the electrical propulsion subsystem components may include a battery and the first electrical propulsion subsystem component is a first battery, and the alternative electrical propulsion subsystem component is a second battery. The first battery may have a first energy storage capacity, and the alternative battery may have a second energy storage capacity, and the second energy storage capacity may be different from the first energy storage capacity. The first battery may have a first C Rating, and the alternative battery may have a second C Rating, and the second C rating may be different from the first C Rating.

In any of the aspects or embodiments described above and herein, the electrical propulsion subsystem components may include an electrical motor, and the first electrical propulsion subsystem component may be a first electrical motor, and the alternative electrical propulsion subsystem component may be an alternative electrical motor, and the first electrical motor may have a first maximum continuous power rating, and the alternative electrical motor may have a second maximum continuous power rating, and the second maximum continuous power rating may be different from the first maximum continuous power rating.

According to another aspect of the present disclosure, a method of operating an aircraft propulsion system is provided. The system has a thermal engine having a plurality of components. The method includes: providing a set of first engine ratings for operating the aircraft propulsion system, the first engine ratings based at least in part on one or more first performance and/or capability parameters of a first thermal engine component; replacing the first thermal engine component with an alternative thermal engine component, the alternative thermal engine component having one or more second performance and/or capability parameters, wherein the one or more second performance and/or capability parameters are different from the one or more first performance and/or capability parameters; producing a set of alternative engine ratings based at least in part on the one or more second performance and/or capability parameters; and operating the aircraft propulsion system using the set of alternative engine ratings.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 3 is a block diagram of an embodiment of the present disclosure.

FIG. 4 is a block diagram of an embodiment of the present disclosure.

DETAILED DESCRIPTION

Embodiments of the present disclosure system and method are configured for use with a hybrid-electric aircraft propulsion system. Embodiments of the present disclosure may be used with an aircraft having a single hybrid-electric aircraft propulsion system, or with aircraft having more than one hybrid-electric aircraft propulsion system.

Figure 1:
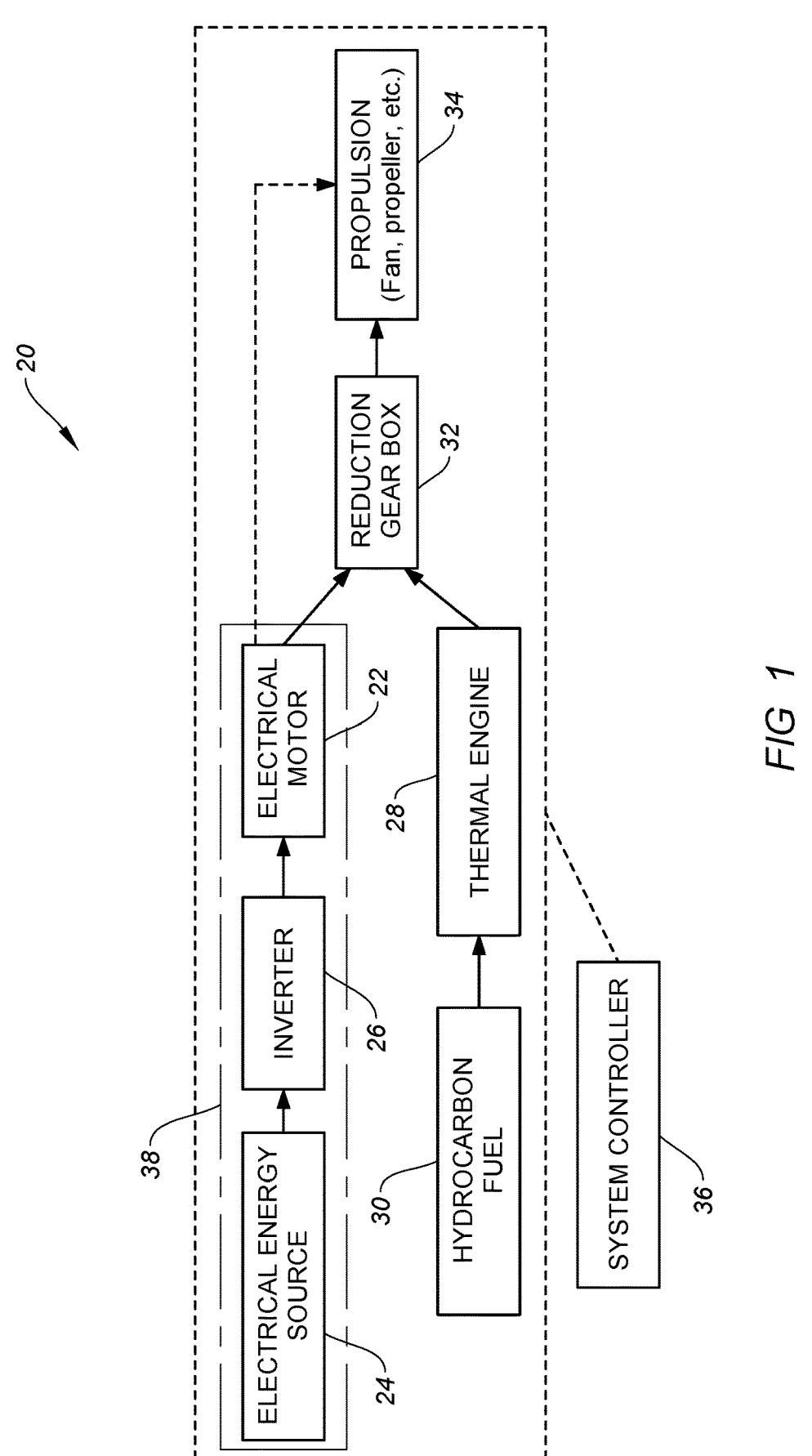
FIG. 1 is a diagrammatic representation of a hybrid-electric propulsion system.

A hybrid-electric aircraft propulsion system uses power generated by at least one thermal engine and power generated by at least one electric motor. FIG. 1 diagrammatically illustrates a hybrid-electric aircraft propulsion system 20 having an electrical motor 22, an electrical energy source 24, an inverter 26, a thermal engine 28, a source of hydrocarbon fuel 30, a reduction gearbox 32, a propulsion unit 34, and a system controller 36. The electrical motor 22, electrical energy source 24, and the inverter 26 may be referred to as an electrical propulsion subsystem 38. The hybrid-electric aircraft propulsion system 20 shown diagrammatically in FIG. 1 is provided to facilitate the description herein and the present disclosure is not limited to this or any hybrid-electric aircraft propulsion system configuration.

In the system 20 embodiment shown in FIG. 1, the electrical motor 22 is configured to provide a motive input into the reduction gearbox 32. The electrical motor 22 typically has a maximum continuous power rating (e.g., torque as a function of rotor speed) and may be rated to provide such power at predetermined motor operating temperature. In some flight segments, the electrical motor 22 motive input may be additive to the motive input into the reduction gearbox 32 from the thermal engine 28. In other flight segments, the electrical motor 22 motive input may be the sole motive input into the reduction gearbox 32. The present disclosure is not limited to hybrid-electric propulsion systems having an electrical motor 22 providing motive input to a reduction gearbox 32. For example, in some configurations the electrical motor 22 may provide motive input to the thermal engine, or the electrical motor 22 may provide motive input between a reduction gearbox and a propulsion unit 34, or the like.

The electrical energy source 24 includes an electrical energy storage device such as one or more batteries, supercapacitors, or the like, and/or electrical energy sources such as fuel cells. In instances wherein the electrical energy storage device includes a battery, the battery will include a "C rating" which is a measurement of the current charging rate and discharging rate of the battery. The battery will also have an energy storage capacity value. In some embodiments, the electrical energy source may include a generator that produces electrical energy. A generator may be driven by the thermal engine 28 and may be configured to provide electrical energy to the electrical motor 22, or to the batteries for recharging purposes, or some combination thereof. The invertor 26 may be configured to convert direct current (DC) from the batteries to alternating current (AC) that may be used to power the electrical motor 22.

Figure 2:
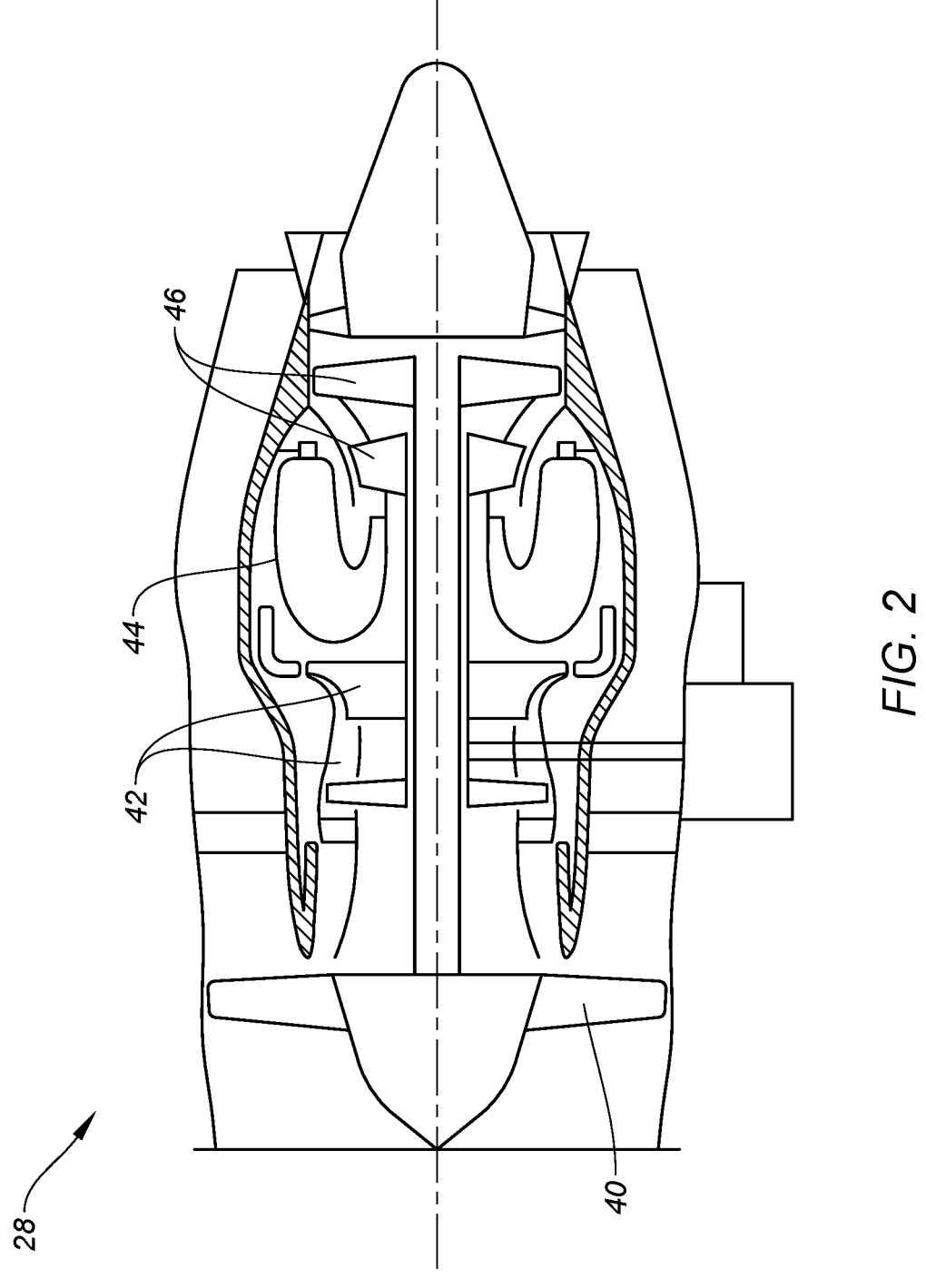
FIG. 2 is a diagrammatic representation of a thermal engine.

The term "thermal engine" as used herein includes various types of gas turbine engines, piston engines, and the like that combust traditional aviation fuels, or sustainable aviation fuels (SAFs), or hydrogen, or any combination thereof. FIG. 2 diagrammatically shows a thermal engine 28 in the form of a gas turbine engine. The gas turbine engine includes a fan section 40, a compressor section 42, a combustor section 44, and a turbine section 46. Although illustrated as a turbofan engine in FIG. 2, the gas turbine engine may alternatively be another type of gas turbine engine, for example a geared turbofan engine, a turboshaft engine, a turboprop engine, or a turbojet engine. Examples of geared turbofan engine architecture are disclosed in U.S. Pat. Nos. 9,726,083; 10,830,153; 11,053,843; 11,073,106; and 11,118, 507, all of which are hereby incorporated by reference in their entirety. In some embodiments, the thermal engine 28 may be a piston engine or a rotary engine. In addition, although the engine 28 is described herein for aircraft flight applications, it should be understood that the present disclosure may also be used with other flight applications; e.g., unmanned flight vehicles.

The propulsion unit 34 may include a propeller for an aircraft, or a rotor for a rotary powered aircraft such as a helicopter, or the like, and may include a propeller blade pitch control system, or a rotor blade pitch control system, or a fan blade pitch control system.

Embodiments of the present disclosure hybrid-electric aircraft propulsion system 20 may include a system controller 36 in communication with other components within the system 20, including the thermal engine 28, the electric motor 22, a reduction gearbox 32, and the like. The system controller 36 configured to control and or receive signals from such components to perform the functions described herein. The system controller 36 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 20 to accomplish the same algorithmically and/or coordination of system components. The system controller 36 may include a single memory device or a plurality of memory devices and the present disclosure is not limited to any particular type of memory device. The functions of the system controller 36 described herein may be performed by an independent system controller 36 or alternatively some or all of the system controller 36 functions may be performed by an engine controller and/or an electric motor controller and/or an avionics system such as a flight control computer. In some embodiments, the system controller functions may be distributed among different system components, for example the determination of the applicable engine ratings may be done by the engine controller, which then transmits to the other systems (for example cockpit displays and flight controls) the engine ratings or limits that have been selected.

During operation of the hybrid-electric aircraft propulsion system 20 shown in FIG. 1, the thermal engine 28 and the electrical motor 22 are configured to provide motive input to drive a propulsion unit 34 for driving the aircraft. The thermal engine 28 and the electrical motor 22 are both coupled with the reduction gear box 32, and the reduction gear box 32 in turn is coupled with the propulsion unit 34. During segments of an aircraft flight, the thermal engine 28 may be controlled to prove all of the motive input necessary to drive the propulsion unit 34, or the electrical engine 22 may be controlled to prove all of the motive input necessary to drive the propulsion unit 34, or the electrical engine 22 and the thermal engine 28 may be controlled to additively provide the motive input necessary to drive the propulsion unit 34. Typically, the electrical motor 22 in a hybrid-electric aircraft propulsion system 20 is controlled to produce motive input that augments the motive input provided by the thermal engine 28 during particular segments of a flight; e.g., during takeoff, cruise, or during an OEI condition.

The ratings of a hybrid-electric propulsion system 20 are selected by the propulsion system manufacturer or integrator based on the performance and capabilities of the propulsion system components, and the approval process of the system 20 is based on those ratings. It should be noted that a single type certification may be sought for an aircraft and its propulsion system, or a type certification may be sought for an aircraft (e.g., an aircraft-level type certificate) and a separate type certification for the propulsion system of the aircraft (e.g., the hybrid-electric propulsion system), or a type certification may be sought for an aircraft powered by a hybrid-electric propulsion system (e.g., an aircraft-level type certification), and a separate type certification for the thermal engine portion of the hybrid-electric propulsion system and a separate type certification for the electrical propulsion subsystem 38 portion of the hybrid-electric propulsion system. The present disclosure is applicable to any of these type certification scenarios. Currently, the type certification for a propulsion system is fixed for the operational life of the system and that operational life may be significant; e.g., 40-50 years. Under current rules, material modifications to a certified propulsion system require the modified system be reapproved and a new or modified type certificate issued.

The present disclosure recognizes that hybrid-electric propulsion systems provide an opportunity to improve the propulsion system during the operational life of the same. The performance and/or capabilities of electrical propulsion subsystem 38 components (e.g., batteries, electrical motors, and the like) may improve over time. Using the batteries as an example, a first battery configuration relied upon in the ratings of the electrical propulsion subsystem 38, may be surpassed by a later available improved second battery configuration. For example, the second battery configuration may have a greater energy storage capacity than the first battery configuration, and/or the second battery configuration may have a greater C rating than the first battery configuration. A system 20 may utilize an upgraded second battery configuration and the certification may be maintained provided the original ratings (e.g., MTO, MCT, AEO, OEI, and the like) are utilized. In such a scenario, however, the second battery configuration may not be used to its fullest potential; e.g., because the engine ratings associated with the issued type certification do not recognize the improvements to the battery and therefore remain unchanged. More specifically, the ratings applicable to usage of the thermal engine 28 remain unchanged despite the improvements to the batteries. As a result, operational benefits that may be available to the thermal engine 28 are also unrealized.

Referring to FIGS. 3 and 4, embodiments of the present disclosure provide a system 20 and method that is configured to leverage improvements of one or more electrical propulsion subsystem 38 components. In the present disclosure, it is assumed that the thermal engine 28 is not modified but that one or more electrical propulsion subsystem 38 components (e.g., batteries, electrical motors, and the like, or any combination thereof) may be modified from an original configuration upon which the original type certification (e.g., indicating the original aircraft performance, engine performance requirements, engine certified ratings, and the like as applicable) is based. Embodiments of the present disclosure leverage improvements of one or more electrical propulsion subsystem 38 components by producing and/or using modified engine ratings that may be associated with the thermal engine 28. For example, if an improved electrical propulsion subsystem 38 component is implemented within the subsystem 38, the system 20 may be configured to utilize the improved parameters of the improved electrical propulsion subsystem 38 component to determine and/or use a modified version of an engine rating that is a function of the performance of the modified electrical propulsion subsystem 38 component. In some instances, it may be desirable to implement an electrical propulsion subsystem 38 component within the subsystem 38 that is not necessarily improved, but is alternatively configured and the alternative configuration provides alternative parameters that provide some desirable benefit. In these instances, the system 20 may be configured to utilize the alternative parameters of the electrical propulsion subsystem 38 component to determine and/or use a modified version of an engine rating that is a function of the performance of the modified electrical propulsion subsystem 38 component.

To illustrate, if the existing batteries of a certified hybrid-electric propulsion system are replaced with improved batteries (e.g., batteries possessing a greater amount of stored electrical energy, or an improved rate of charge or discharge, or the like), a modified engine rating for maximum cruise power (MCR) or all engines operating (AEO) may be determined based on a greater percentage of the required power being provided by the electrical motor 22 and a lesser percentage of the power being provided by the thermal engine 28 in view of the fact that the improved batteries can power the electrical motor 22 at a higher burden rate and/or for a longer period of time. The decreased burden/stress on the thermal engine 28 can improve the component lifing of the thermal engine 28 (and its components) and/or decrease the maintenance requirements of the thermal engine 28. In similar fashion, modified engine ratings such as maximum takeoff thrust (MTO) and/or maximum continuous thrust (MCT) may be determined based on a greater percentage of the required thrust being provided by the electrical motor 22 and a lesser percentage of the thrust being provided by the thermal engine 28 in view of the fact that the improved batteries can power the electrical motor 22 at a higher burden rate and/or for a longer period of time. Here again, the decreased burden/stress on the thermal engine 28 can improve the component lifing of the thermal engine 28 and/or decrease the maintenance requirements of the thermal engine 28. As yet another example, a modified engine rating for an emergency condition such as one engine operative (OEI) may be determined based on a greater percentage of the required thrust being provided by the electrical motor 22 and a lesser percentage of the thrust being provided by the thermal engine 28 in view of the fact that the improved batteries can power the electrical motor 22 at a higher burden rate and/or for a longer period of time.

In some embodiments (as will is described in greater detail below), the present disclosure may be configured to permit a tiered type certification with different ratings at different tiers. In these embodiments, the present disclosure may be configured to permit changes between different rating tiers during flight based on a change in the operational status of a component within the electrical propulsion subsystem 38. For example, the system may operate under a first tier type certification (and the ratings associated therewith) based on a current status of a battery, and be configured to operate under a second tier type certification (and the ratings associated therewith) based on a change in the status of a battery; e.g., the battery is recharged during a flight segment. As another example, the system may operate under a first tier type certification (and the ratings associated therewith) based on a hybrid-electric propulsion system operating under a first fault status, and be configured to operate under a second tier type certification (and the ratings associated therewith) based on a change in the fault status; e.g., the fault status is present and then is resolved, or vice versa.

As can be seen by these examples, the present disclosure system 20 provides a means for utilizing improved electrical propulsion subsystem 38 components and leveraging those improvements to produce and/or use modified engine ratings beneficial to the thermal engine 28 and its operation. In particular, improvements in an electrical propulsion subsystem 38 component (e.g., battery, electrical motor 22, and the like) that are recognized via modified engine ratings can allow more thermal engine 28 power to be dedicated to long duration conditions such as cruise and maximum continuous power (MCT) because of the decreased thermal engine 28 burden in other flight segments such as during takeoff. The ability of the present disclosure system 20 to utilize improved electrical propulsion subsystem 38 components may also permit increases in permitted engine ratings/power at given atmospheric conditions since a greater percentage of the power requirements for OEI conditions are satisfied by the electrical motor 22 and a lesser percentage of the power requirements for OEI conditions are satisfied by the thermal engine 28.

The present disclosure system 20 examples provided above are described in terms of how an improved battery may be used to produce and/or use modified engine ratings beneficial to the thermal engine 28 and its operation. The present disclosure is not limited to improvements in batteries. The present disclosure system 20 is able to leverage improvements in other electrical propulsion subsystem 38 components such as improvements in electrical motors and the like.

In some embodiments, the present disclosure system 20 may be configured to accept input parameters of an electrical propulsion subsystem 38 component (e.g., a battery) and to determine modified ratings using the input parameters. As stated above, a type certification may be issued to an aircraft, a propulsion system, propulsion system components; e.g., separate type certifications for the thermal engine portion and the electrical propulsion portion of a hybrid-electric propulsion system. The present disclosure is applicable to any of these type certification scenarios with the system 20 being configured to accept input parameters of an electrical propulsion subsystem 38 component (e.g., a battery) and to determine modified ratings using the input parameters for any of the aforesaid types of type certifications. For example, the system controller 36 may be configured (e.g., via stored instructions) initially with original parameter values for an original electrical propulsion subsystem 38 component and an original set of engine ratings that are based on those original parameter values. In this present disclosure embodiment, the system controller 36 may be configured to accept an input of updated set of parameter values for the electrical propulsion subsystem 38 component. Upon entry of the updated parameter values, the system controller 36 may be configured to produce modified engine ratings based on the updated parameter values. The produced modified engine ratings may be engine rating values that are stored and accessed by the system controller 36, or the produced modified engine ratings may be engine rating values that are algorithmically determined using instructions stored and accessed by the system controller 36. Alternatively, the system controller 36 may be reprogrammed with new instructions; e.g., the stored instructions (e.g., software) utilized by the system controller 36 with the original parameter values of the originally supplied electrical propulsion subsystem 38 component may be replaced/updated with stored instructions (e.g., software) that reflects the updated parameter values associated with the updated electrical propulsion subsystem 38 component.

As stated above, the functions of the system controller 36 may be performed by an independent system controller 36 or collectively by a plurality of different controllers; e.g., an engine controller, an electric motor controller, an avionics system controller, or the like. In the latter embodiments, when the electrical propulsion subsystem 38 is modified to include a different electrical propulsion subsystem component, the system controller functions may be distributed among different electrical propulsion subsystem 38 components. For example, the determination of the modified engine ratings may be performed by a first controller (e.g., the system controller 36), and that controller may communicate modified engine ratings or limits to other system components (including, for example, cockpit displays and flight controls) and any controller associated therewith.

In some embodiments of the present disclosure, type certification of a hybrid-electric propulsion system 20 may be a tiered certification with different engine ratings at different tiers; e.g., see FIG. 4. For example, the engine ratings of the system 20 may be certified with a first type certification based on the system 20 using batteries having a first set of operating parameters, and may be certified with a second type certification based on the system 20 using improved batteries having a second set of operating parameters, and may be certified with a third type certification based on the system 20 using improved batteries having a third set of operating parameters, and so on. In similar fashion, the engine ratings of the system 20 may be certified with a first type certification based on the system 20 using a first electrical motor having a first set of operating parameters (e.g., a first maximum continuous power rating), and may be certified with a second type certification based on the system 20 using a second electrical motor having a second set of operating parameters (e.g., a second maximum continuous power rating greater than the first), and may be certified with a third type certification based on the system 20 using a third electrical motor 22 having a third set of operating parameters (e.g., a third maximum continuous power rating greater than the second), and so on. In this manner, it may be possible to upgrade certain electrical propulsion subsystem 38 components during the operational life of the hybrid-electric propulsion system 20 and leverage those improvements to produce and/or use modified engine ratings beneficial to the thermal engine 28 without the need to have the hybrid-electric propulsion system 20 recertified for each change. In those embodiments of the present disclosure configured to permit a tiered type certification (e.g., as described herein wherein engine ratings of the system 20 may be certified with a plurality of different type certifications based on electrical propulsion subsystem 38 components having different operational parameters), the tiers of type certification may be selected by the engine manufacturer (or other party) during initial analysis of the hybrid-electric propulsion system. For example, during initial testing of the thermal engine, the engine manufacturer may conduct analysis of how the key thermal engine parameters (e.g., ratings, time between overhaul, maintenance schedule, and the like) can be varied if operating parameters of one or more electrical propulsion subsystem 38 components are changed; e.g., a replacement battery having a change in energy storage capacity, or a replacement electrical motor having a change in maximum continuous power rating, and so on. Once determined, the tiers of ratings can be provided to the appropriate regulatory agency for approval, and tiers of type certification granted if approved. In this manner, the engine certification testing may be performed anticipating the changes in ratings that may be requested in the future due to changes in electrical propulsion subsystem 38 and later in time recertification can be minimized or avoided.

It is understood that a significant benefit of the present disclosure relates to the decreased burden on the thermal engine 28 and consequent slower thermal engine 28 degradation that is associated with the recognizing and utilizing an improved electrical propulsion subsystem 38 component such as, but not limited to, a battery. The improved electrical propulsion subsystem 38 component is understood to make it possible for the electrical propulsion subsystem 38 to provide a greater percentage of the requisite power and/or a greater percentage of mission energy during certain segments of flight; e.g., during takeoff, cruise, and the like. As a result, on any given flight the thermal engine 28 would consume less of its useful life. This in turn may make it possible to meet the expected time between thermal engine 28 overhaul with less field margin (the margin on temperature or speed that is consumed as the engine ages), while guaranteeing engine power output at the 30 sec OEI rated limits (of temperature and compressor speed). This unused field margin could be used to increase the OEI limits (e.g. the 30 sec OEI ITT limit or the 30 sec OEI Ng limit), provided these increased limits were certified and permitted in advance. In addition, the ability of the present disclosure system 20 to consume less of the thermal engine 28 useful life on any given flight may permit a relaxation of thermal engine 28 inspection requirements and/or may permit more occurrences on the thermal engine 28 of the use of the OEI or other emergency power.

Figure 5:
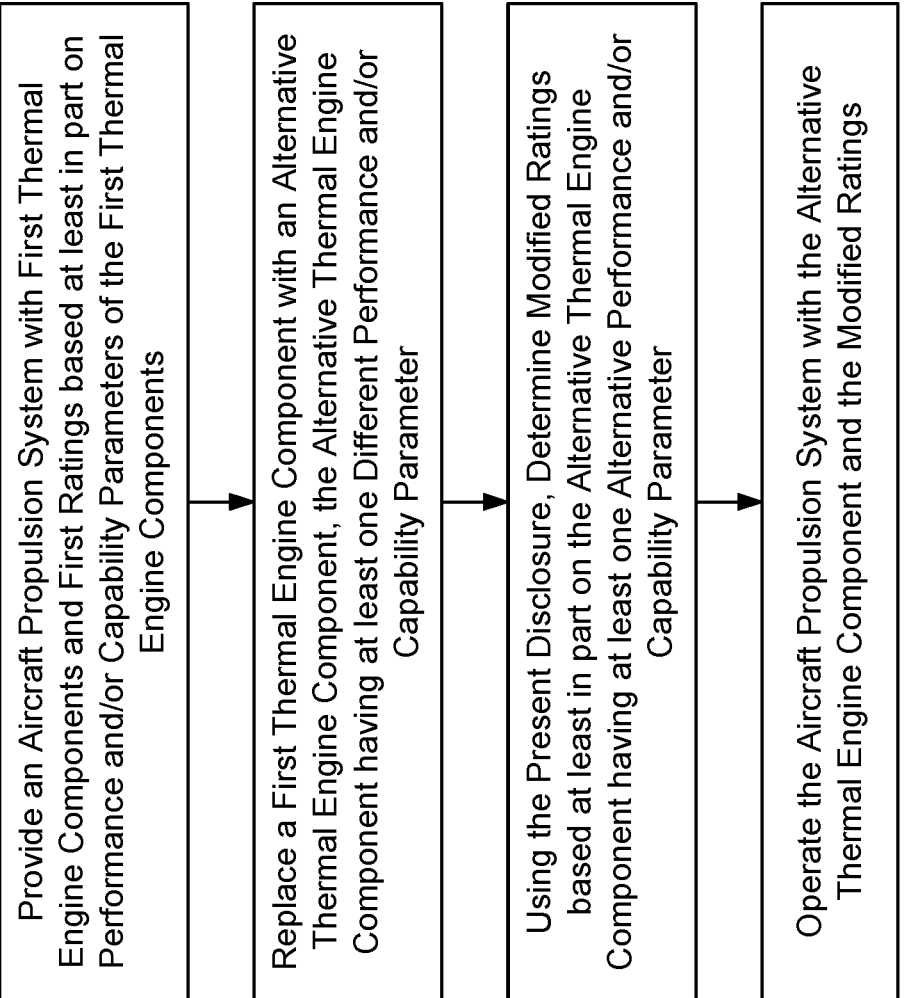
FIG. 5 is a block diagram of an embodiment of the present disclosure.

Referring to FIG. 5, the present disclosure is described above in terms of a system and method configured for use with a hybrid-electric aircraft propulsion system. In alternative embodiments, the present disclosure may be used to leverage improvements or alternative configurations of components within a conventional propulsion system that includes only a thermal engine. The performance and/or capabilities of a thermal engine component may improve or differ in a beneficial way over time. Embodiments of the present disclosure may produce and/or use modified ratings that are based on the modified/different thermal engine component. For example, if an improved thermal engine component is utilized within the thermal engine, the system 20 may be configured to utilize the improved/different parameters of the new thermal engine component to determine and/or use a modified version of a rating that is a function of the performance of the new thermal engine component.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of operating a hybrid-electric propulsion system, the system having a thermal engine and an electrical propulsion subsystem having a plurality of components, comprising:

providing a set of original engine ratings for operating the hybrid-electric propulsion system, the original engine ratings based at least in part on one or more first performance and/or capability parameters of an original electrical propulsion subsystem component;

replacing the original electrical propulsion subsystem component with an alternative electrical propulsion system component, the alternative electrical propulsion subsystem component having one or more second performance and/or capability parameters, wherein the one or more second performance and/or capability parameters are different from the one or more first performance and/or capability parameters;

producing a set of alternative engine ratings based at least in part on the one or more second performance and/or capability parameters; and operating the hybrid-electric propulsion system using the set of alternative engine ratings;

wherein the set of original engine ratings and the set of alternative engine ratings are both covered by a first type certification of the thermal engine.

2. The method of claim 1, wherein the electrical propulsion subsystem components include an electrical motor and electrical energy source.

3. The method of claim 2, wherein the electrical energy source is a fuel cell.

4. The method of claim 2, wherein the original electrical propulsion subsystem component is an original said electrical motor, and the alternative electrical propulsion subsystem component is an alternative electrical motor.

5. The method of claim 4, wherein the original electrical motor has a first maximum continuous power rating, and the alternative electrical motor has a second-maximum continuous power rating, and the second maximum continuous power rating is different from the first maximum continuous power rating.

6. The method of claim 1, wherein the electrical propulsion subsystem components include an electrical motor and electrical energy storage device.

7. The method of claim 6, wherein the electrical energy storage device is a supercapacitor.

8. The method of claim 6, wherein the electrical energy storage device is a battery.

9. The method of claim 8, wherein the original said electrical propulsion subsystem component is an original battery, and the alternative said electrical propulsion subsystem component is an alternative battery.

10. The method of claim 9, wherein the original battery has a first energy storage capacity, and the alternative said battery has a second energy storage capacity, and the second energy storage capacity is different from the first energy storage capacity.

11. The method of claim 9, wherein the original battery has a first C Rating, and the alternative said battery has a second C Rating, and the second C rating is different from the first C Rating.

12. The method of claim 1, wherein in the original engine ratings the thermal engine is controlled to provide a first percentage of motive input and the electrical propulsion subsystem is controlled to provide a second percentage of motive input during a flight segment, and in the alternative engine ratings the thermal engine is controlled to provide a third percentage of motive input during the flight segment, wherein the third percentage of motive input is different from the first percentage of motive input, and the electrical propulsion subsystem is controlled to provide a fourth percentage of motive input during the flight segment, wherein the fourth percentage of motive input is different from the second percentage of motive input.

13. The method of claim 12, wherein the thermal engine has a first useful life value based on the original engine ratings, and the thermal engine has a second useful life value based on the alternative engine ratings, and the second useful life value is different from the first useful life value.

14. A hybrid-electric propulsion system, comprising:
a thermal engine;
an electrical propulsion subsystem having a plurality of components; and
a system controller in communication with the thermal engine, the electrical propulsion subsystem, and a non-transitory memory storing instructions, wherein the stored instructions include a set of first engine ratings for operating the hybrid-electric propulsion system, the first engine ratings based at least in part on one or more first performance and/or capability parameters of a first electrical propulsion subsystem component, which instructions when executed cause the system controller to:
subsequent to the one or more first performance and/or capability parameters of the first said electrical propulsion subsystem component being replaced with one or more second performance and/or capability parameters, wherein the one or more second performance and/or capability parameters are different from the one or more first performance and/or capability parameters, use a set of alternative engine ratings based at least in part on the one or more second performance and/or capability parameters; and
control the hybrid-electric propulsion system using the set of alternative engine ratings and the one or more second performance and/or capability parameters;

wherein the set of original engine ratings and the set of alternative engine ratings are both covered by a first type certification of the thermal engine.

15. The system of claim 14, wherein the one or more first performance and/or capability parameters of the first electrical propulsion subsystem component are replaced with one or more second performance and/or capability parameters by replacing the first electrical propulsion subsystem component an alternative electrical propulsion subsystem component; and
wherein the electrical propulsion subsystem components include a battery and the first electrical propulsion subsystem component is a first said battery, and the alternative said electrical propulsion subsystem component is a second said battery.

16. The system of claim 15, wherein the first said battery has a first energy storage capacity, and the second battery has a second energy storage capacity, and the second energy storage capacity is different from the first energy storage capacity.

17. The system of claim 15, wherein the first battery has a first C Rating, and the second battery has a second C Rating, and the second C rating is different from the first C Rating.

18. The system of claim 15, wherein the electrical propulsion subsystem components include an electrical motor, and the first electrical propulsion subsystem component is a first electrical motor, and the alternative electrical propulsion subsystem component is an alternative electrical motor, and the first electrical motor has a first maximum continuous power rating, and the alternative electrical motor has a second maximum continuous power rating, and the second maximum continuous power rating is different from the first maximum continuous power rating.

19. The system of claim 14, wherein in the first engine ratings the thermal engine is controlled to provide a first percentage of motive input and the electrical propulsion subsystem is controlled to provide a second percentage of motive input during a flight segment, and in the alternative engine ratings the thermal engine is controlled to provide a third percentage of motive input during the flight segment, wherein the third percentage of motive input is different from the first percentage of motive input, and the electrical propulsion subsystem is controlled to provide a fourth percentage of motive input during the flight segment, wherein the fourth percentage of motive input is different from the second percentage of motive input.

20. A method of operating an a hybrid-electric aircraft propulsion system, the system having a thermal engine and an electrical propulsion system having a plurality of components, comprising:
providing a set of original engine ratings and limits for operating the hybrid-electric propulsion system, wherein the set of original engine ratings and limits is based at least in part on one or more first performance and/or capability parameters of an original electrical propulsion subsystem component;
identifying an alternative electrical propulsion system component, the alternative electrical propulsion subsystem component having one or more second performance and/or capability parameters, wherein the one or more second performance and/or capability parameters are different from the one or more first performance and/or capability parameters;
producing a set of alternative engine ratings and limits for the alternative electrical propulsion subsystem component based at least in part on the one or more second performance and/or capability parameters; and subsequent to replacing the first electrical propulsion subsystem component with the alternative electrical propulsion subsystem component, using the set of alternative engine ratings and limits based at least in part on the one or more second performance and/or capability parameters; and controlling the hybrid-electric aircraft propulsion system using the set of alternative engine ratings and limits and the one or more second performance and/or capability parameters of the alternative electrical propulsion subsystem components;

wherein the set of original engine ratings and limits and the set of alternative engine ratings and limits are both covered by a first type certification of the hybrid-electric aircraft propulsion system.

* * * * *